United States Patent
Batlle i Ferrer et al.

(10) Patent No.: US 8,699,839 B2
(45) Date of Patent: Apr. 15, 2014

(54) OPTICAL EARTH CABLE FOR UNDERGROUND USE

(75) Inventors: Josep Maria Batlle i Ferrer, Milan (IT); Josep Maria Martin-Regalado, Milan (IT); Matias Campillo, Milan (IT)

(73) Assignee: Prysmian S.p.A., Milan (IT)

( * ) Notice: Subject to any disclaimer, the term of this patent is extended or adjusted under 35 U.S.C. 154(b) by 212 days.

(21) Appl. No.: 13/057,437

(22) PCT Filed: Aug. 4, 2008

(86) PCT No.: PCT/EP2008/060202
§ 371 (c)(1),
(2), (4) Date: Apr. 29, 2011

(87) PCT Pub. No.: WO2010/015276
PCT Pub. Date: Feb. 11, 2010

(65) Prior Publication Data
US 2011/0200290 A1    Aug. 18, 2011

(51) Int. Cl.
*G02B 6/44*    (2006.01)
(52) U.S. Cl.
USPC ............ 385/101; 385/100; 385/109; 385/110
(58) Field of Classification Search
USPC ...................................... 385/101
See application file for complete search history.

(56) References Cited

U.S. PATENT DOCUMENTS

| | | | |
|---|---|---|---|
| 4,552,432 A * | 11/1985 | Anderson et al. ............ | 385/101 |
| 4,673,247 A | 6/1987 | Oestreich | |
| 4,865,415 A | 9/1989 | Kitayama | |
| 4,909,592 A * | 3/1990 | Arroyo et al. ............... | 385/113 |
| 4,952,012 A * | 8/1990 | Stamnitz ....................... | 385/101 |
| 5,687,271 A | 11/1997 | Rabinowitz | |
| 5,822,484 A * | 10/1998 | Arroyo ........................... | 385/101 |
| 5,913,003 A * | 6/1999 | Arroyo et al. ............... | 385/101 |
| 6,226,430 B1 | 5/2001 | De Castro et al. | |
| 6,674,945 B1 | 1/2004 | Rowland et al. | |
| 2004/0262027 A1* | 12/2004 | Kaczmarski ............. | 174/113 R |

FOREIGN PATENT DOCUMENTS

| | | |
|---|---|---|
| EP | 1 233 496 A1 | 8/2002 |
| WO | WO-98/08124 | 2/1998 |
| WO | WO-99/05688 | 2/1999 |
| WO | WO-00/19452 | 4/2000 |
| WO | WO-01/13154 A1 | 2/2001 |
| WO | WO 2008/037291 A1 | 4/2008 |

OTHER PUBLICATIONS

DuPont, "Mylar polyester film", Jun. 2003.*
International Search Report from the European Patent Office for International Application No. PCT/EP2008/060202 (Mail date Oct. 30, 2008.
IEC 60332-1-2, "Tests on Electric and Optical Fibre Cables Under Fire Conditions," International Standard, International Electrotechnical Commission, pp. 1-21, (2004).
IEC 60332-3-24, "Tests on Electric Cables Under Fire Conditions," International Standard, International Electrotechnical Commission, pp. 1-25, (2000).

* cited by examiner

*Primary Examiner* — Ryan Lepisto
(74) *Attorney, Agent, or Firm* — Finnegan, Henderson, Farabow, Garrett & Dunner, L.L.P.

(57) ABSTRACT

An earth cable adapted for being laid underground includes at least one optical fiber, a thermally conducting polymeric layer surrounding the at least one optical fiber, and copper conductors arranged in a radially-external position with respect to the thermally conducting polymeric layer.

12 Claims, 3 Drawing Sheets

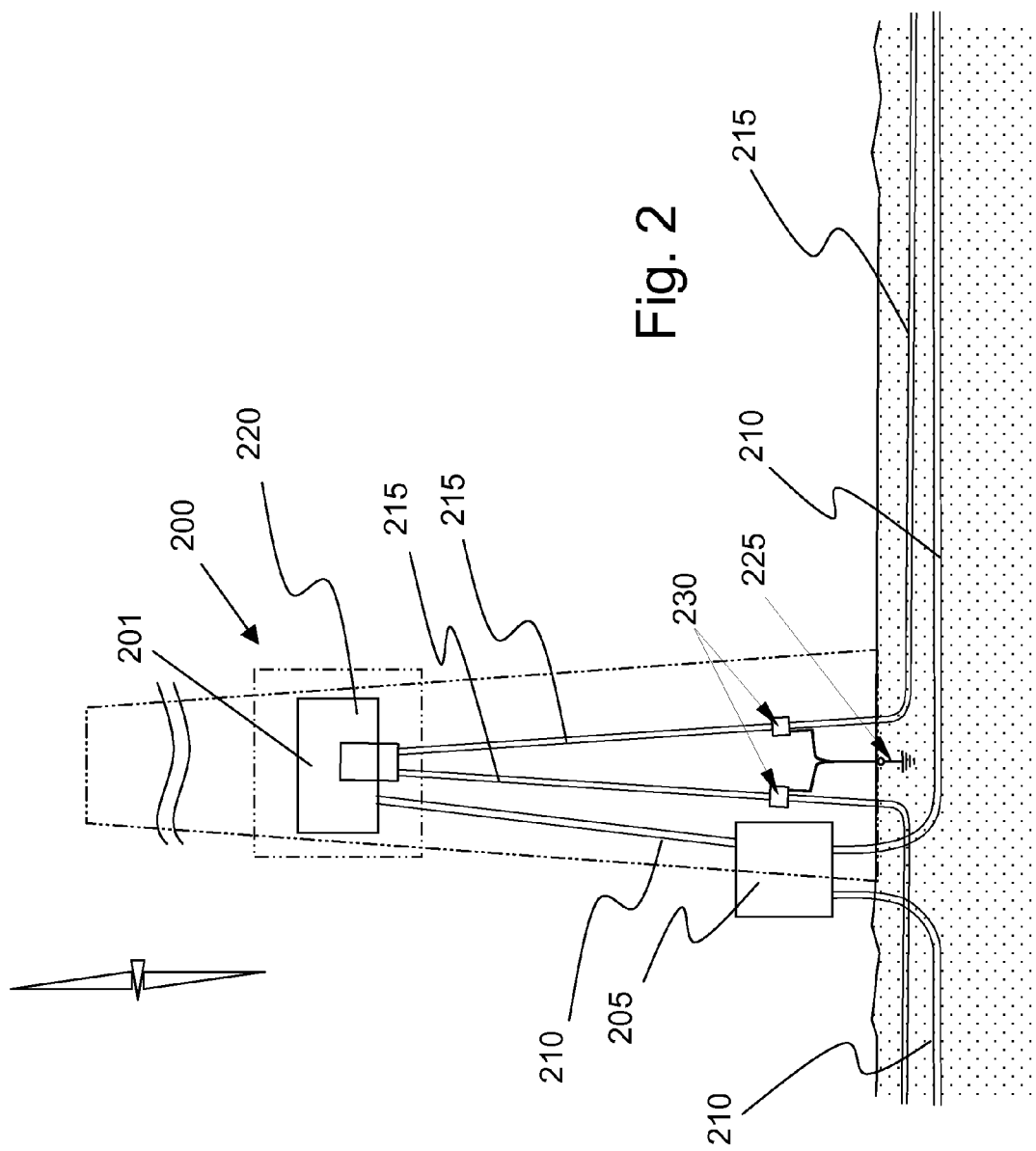

OPTICAL EARTH CABLE FOR UNDERGROUND USE

CROSS REFERENCE TO RELATED APPLICATION

This application is a national phase application based on PCT/EP2008/060202, filed Aug. 4, 2008, the content of which is incorporated herein by reference.

BACKGROUND OF THE INVENTION

1. Field of the Invention

The present invention generally relates to cables having the double function of earth conductors and optical telecommunications cables. More particularly, the invention relates to earth cables including optical fibers for telecommunications purposes, and which are laid underground.

2. Description of the Related Art

Some electrical apparatus, for example wind mill towers for power generation, can make use of different cables for interconnecting such apparatuses to an electrical network and for services associated thereto. In particular, electrical cables, typically medium voltage cables, allow the power transport— generated power, in the case of a wind mill tower—; earth cables are connected to the earth system of the apparatus or of the network to which such apparatuses belong, and to the ground; optical cables are also used to provide communication or telecommunication services, as well as for the control of the apparatus operation and other functions. Typically, the three cable types above are at least partially laid underground, conveniently in the same trench.

In principle, earth cables can have a very simple structure, generally comprising, but also merely consisting of, a metallic conductor, typically in form of stranded wires. The metallic conductor is preferably a copper conductor. An example of such prior art earth cable according is depicted in FIG. 4.

Optical cables have a structure determined by their location and by the need to provide a suitable protection to the optical fibers contained therein. The optical fiber sensitivity to mechanical stress together with the environmental conditions, such as presence of water and/or chemical agents that could penetrate into the cable, and attack by animals such as rodents are examples of the requirements which have to be taken into account in the design of such cables.

The cable laying method comprises the positioning of the cable in a sand bedding; the sand bedding is then covered by a layer of ground based on small particle dimension material (for example, selected from the trench excavation material), covered, in turn, by common ground (typically, the remainder of the trench excavation material). This process is cumbersome and time-consuming in case many different cables are to be laid into the trench.

Cables comprising an earth conductor and optical fibers are known for aerial use. Such cables, usually called optical ground cable wires (OPGWs), typically comprise aluminum and/or stainless steel tubes housing the optical fibers combined with wires of aluminum or reinforced aluminum, for example aluminum clad steel and/or aluminum alloy, to provide short-circuit capacity and further provide the cable with mechanical strength as required for overhead installation. An example of OPGW is described in EP 1210633. Such cables are not suitable for use underground, for many reasons, including the fact that the presence of aluminum tubes housing the fibers would result in corrosion and in possible formation of hydrogen, which would accumulate in time inside the tubes, causing consequent worsening of the performance of the optical fibers.

The use of aerial ground cable wires is not possible or convenient in most cases, for example when wind mills are present, because possible aerial lines would disturb the location of the wind mills towers. In addition, absent an overhead power line, to which they could be associated with, they would need independent poles, which would increase the cost and complexity of the system.

The Applicant has observed that a simpler installation could be provided by combining an underground earth cable with a communication cable comprising optical fibers. In particular, it has been found that, by inserting an optical element containing optical fibers into an assembly of electrical wires suitable for providing ground connection, the electrical wires can act as armour for the optical element, thereby providing suitable protection from the soil where the cable has been laid.

Such earth conductor suitable to be laid underground should have a structure satisfying diverse requirements. A sufficient mechanical protection to the optical fibers contained in the cable is a must. At the same time, the optical fibers should be easily extractable from the cable at any point of its length—not only at the heads thereof—for effecting foreseen and unforeseen connections to premises. Furthermore, a suitable protection for the optical fibers should be provided from temperature increases due to the current passing trough the electrical wires A robust mechanical protection could allow an easy laying of the cable underground, too.

In view of the environment, the cable should also be resistant to attacks by water and/or chemical agents and/or by animals like rodents.

As for the electrical connection of the earth cable to the ground system, it can be realized with clamps, but the use of welding is usually preferred because more economical on a long term basis. During the welding a substantial heat is generated, possibly harmful for the optical fibers that are generally tested for temperature not higher than 60° C. A thermal protection for the optical fibers contained in the cable is desirable.

SUMMARY OF THE INVENTION

The Applicant has found that a communication cable containing optical fibers and an earth cable containing earth conductors can be combined in a single cable suitable for underground use by providing a structure wherein the optical fibers are surrounded by a polymeric layer having a predetermined thermal conductivity (hereinafter referred to as thermally conducting polymeric layer). Copper conductors are provided in a radially external position with respect to and surrounding said thermally conductive polymeric layer.

The thermally conducting polymeric layer provides a mechanical protection to the optical fibers, and protects them against heating generated, for example, by a welding procedure for effecting the electrical connection, or by short-circuit; the thermally conducting polymeric layer, in view of the polymeric nature of the material thereof, also allows the "escape", by diffusion therethrough, of hydrogen possibly formed in the surrounding of the optical fibers, so that the accumulation of hydrogen does not take place; the thermally conducting polymeric layer further permits an easy access to the optical fibers for the extraction thereof from any point of the cable.

The thermal conductivity of copper conductors is far higher than that, for example, of aluminum. The use of copper conductors in the presence of a thermally conducting polymeric layer makes the cable operation safe for the optical fibers even in the event of elevated heat in the cable, for example in case of welding.

Besides the electrical function as earth conductors, the copper conductors provide the sought mechanical strength to the cable and protection for the optical fibers contained therein.

Accordingly, the present invention relates to an optical ground cable adapted for being laid underground, comprising at least one optical fiber; a thermally conducting polymeric layer surrounding the at least one optical fiber; and copper conductors arranged in a radially external position with respect to the thermally conducting polymeric layer.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The at least one optical fiber according to the present invention comprises an optical transmissive core, typically made of glass, surrounded by one or more protective coatings.

The optical fiber may be suitably loosely contained in a buffer tube, made of a polymeric material.

Preferably, the thermally conducting polymeric layer of the cable of the invention has a thermal conductivity (i.e, the property of a material that indicates its ability to conduct heat) of at least 0.3 W/m·K, preferably of at least 0.4 W/m·K. The thermal conductivity of the thermally conducting polymeric layer according to the invention can be up to 0.9 W/m·K.

Preferably, the thermally conducting polymeric layer of the cable of the invention comprises a flame retardant material.

According to the present description and claims, as "flame retardant" is meant a material having the capacity of delaying the flame propagation according to IEC 60332-1-2 (2004).

Preferably, the thermally conducting polymeric layer comprises a halogen-free material.

The thermally conducting polymeric layer may advantageously be made of a polymeric material based on ethylene or propylene polymers or copolymers, or mixture thereof added with inorganic flame-retardant filler, for example magnesium hydroxide. Examples of materials suitable for use as thermally conducting polymeric materials within the present invention are described in EP-A-0998747 or in EP-A-1116244.

Preferably, the thermally conducting polymeric layer comprises a fire retardant material. In the present description and claims as "fire retardant" is meant a material having the capacity of withstanding the fire according to IEC 60332-3-24 (2000).

Other exemplary materials for the thermally conducting polymeric layer of the invention are high density polyethylene (HDPE), medium density polyethylene (MDPE) and low density polyethylene (LDPE).

The polymeric material of the buffer tube can be substantially the same of that of the thermally conducting polymeric layer.

In a preferred embodiment of the invention, a water-blocking thread layer, for example of aramid yarn or glass fiber, and a water-swellable powder is provided in a radially internal position with the respect to the thermally conducting polymeric layer. For example, said water blocking layer surrounds the buffer tube loosely containing the at least one optical fiber. The water-blocking thread layer contributes to protecting the optical fibers against heat, and further prevents the longitudinal propagation of water. When the thread layer is based on glass fiber, an anti-rodents protection of the cable is achieved.

The copper conductors form the earth conductor, and contribute, with the help of the thermally conducting polymeric layer, to provide the cable with the desired mechanical strength. The copper conductors also protect the cable against attacks by animals like rodents.

The copper conductors are provided around the thermally conducting polymeric layer in a substantially longitudinal configuration with respect to the cable axis. Preferably the conductors are in direct contact with the thermally conducting polymeric layer.

The mechanical protection of the optical fibers ensured by the association copper conductors/thermally conducting polymeric layer is such to allow a faster and less complicated laying out procedure of the cable of the invention. In particular, the use of sand bedding is no longer necessary, and the cable can be laid directly in a layer of ground based on small particle dimension material, which can for example be material selected from the cable trench excavation material.

Copper is thermodynamically stable, i.e. it substantially does not react, in the presence of water. On the other side, the thermal conductivity of copper is far higher than that of aluminum (401 W/m·K vs 237 W/m·K) and this can give rise to temperature rising harmful for the optical fibers, especially in case of short circuit and in welding procedure, particularly of the Cadwell type, that will be described in the following. In the cable according to the present invention, high thermal episodes do not give rise to problems, thanks to the presence of the thermally conducting polymeric layer, that ensures that the optical fibers are very well protected and kept safe even in the event of a heat peak.

In case of high thermal peaks locally generated, for example in case of welding or of short circuits, if the generated heath is kept confined within a relatively small volume, an unacceptable high temperature value would be reached, which would be radially transmitted to the fibers inside the cable, causing a damage thereof. However, the presence of the thermally conducting polymeric layer enables the locally generated heath to be transmitted longitudinally along the cable length, thereby distributing the heath in such a way that the reached temperature peak remains below the acceptable value for the fibers housed within the cable.

BRIEF DESCRIPTION OF THE DRAWINGS

These and other features and advantages of the present invention will readily appear from the reading of the detailed description that follows, in which exemplary embodiments of the invention are presented in conjunction with the attached drawings, wherein:

FIG. 2 schematically shows an example of a system where the cable of FIGS. 1A and 1B can be used.

DETAILED DESCRIPTION OF EMBODIMENTS OF THE INVENTION

Figure 4:
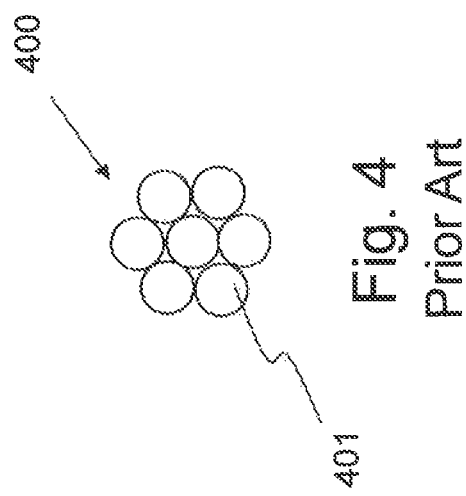
FIG. 4 shows a cross section of an earth cable according to the prior art.

An earth cable according to the prior art is shown in FIG. 4, wherein a cable 400 comprises wire conductors 401 in stranded configuration. This cable is also referred to as "bare conductor" cable in view of the absence of any sheathing.

Figure 1A:
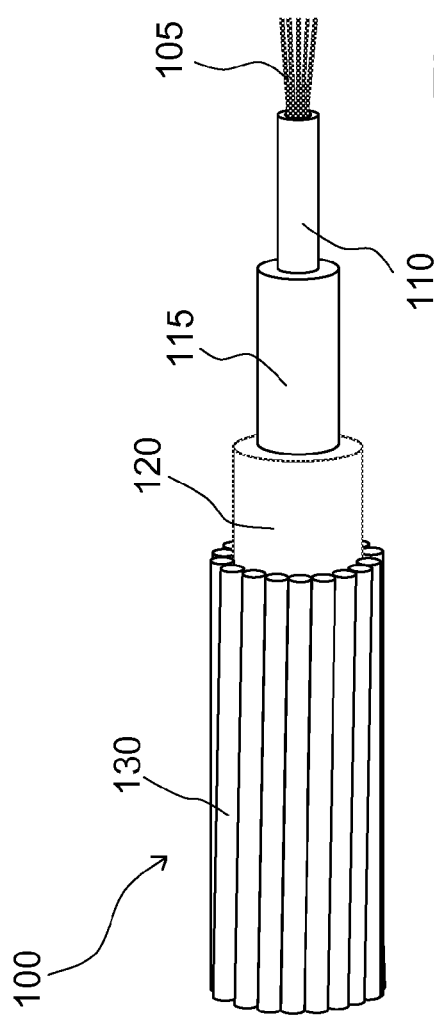
FIGS. 1A and 1B show, respectively in perspective view and in cross-section, a cable according to an embodiment of the present invention.
Figure 1B:
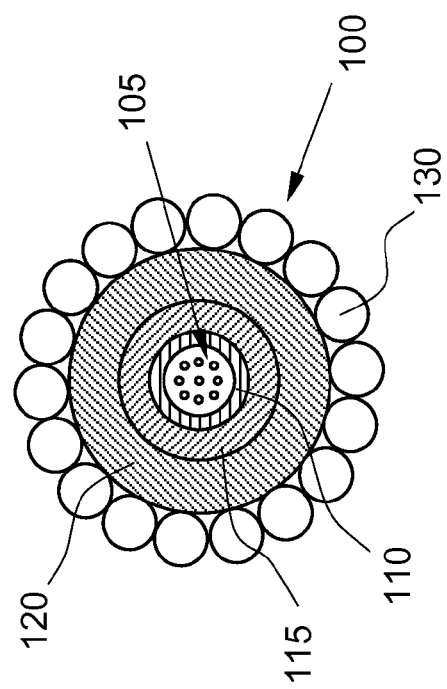

Making reference to the drawings, and particularly to FIGS. 1A and 1B, a cable according to an embodiment of the present invention, globally denoted 100, comprises at least one optical fiber 105, preferably a plurality of optical fibers, for example in a number ranging from 8 to 24 (the cable may however comprise different numbers of optical fibers). The optical fibers 105 can be either single-mode or multi-mode optical fibers. The optical fibers 105 are loosely accommodated within a buffer tube 110. For example, eight optical fibers are contained in a buffer tube having an inner diameter of 3.10 mm and an outer diameter of 4.40 mm.

It is pointed out that more than one buffer tube could be present in the cable 100, each containing a predetermined number of optical fibers 105. In case more than one buffer tube is contemplated, they are preferably stranded, either in continuous or in alternated helix (S-Z) configuration.

Around the buffer tube(s) 110, a layer 115 of a water-blocking thread material is provided, forming a water-blocking layer. The water-blocking thread material used for the layer 115 can be aramid yarn or, preferably, glass fiber, added, preferably coated by a water-swellable powder.

A layer 120 formed of a thermally conducting polymeric material is provided around the layer 115. The exemplified polymeric material is a flame-retardant, halogen-free one, with a thermal conductivity of, for example, 0.6 W/m·K. A material suitable for this end is used in cables marketed by Prysmian S.p.A. under the trademark Afumex™, and comprises, for example, a blend of polypropylene and linear low density polyethylene (LLDPE) containing magnesium hydroxide. Another example of a material suitable for the thermally conducting polymeric layer 120 of the invention is based on ethylene vinyl acetate (EVA) polymer containing aluminum hydroxide.

The thermally conducting polymeric layer 120 can have a thickness of from 0.5 mm to 3 mm. A thickness of at least 1 mm is preferable from a mechanical point of view.

Electrically-conductive copper wires 130 are provided in a radially external position with respect to thermally conducting polymeric layer 120 and in direct contact thereto.

The thermally conducting polymeric layer 120 contributes to mechanically protect the optical fibers 105, especially it protects them against heat. Heat may be generated for example during a welding procedure for effecting the electrical connection of the cable to, e.g., an earth system, as described later on, or, when the cable is in operation, in case of short-circuit.

The thermally conducting polymeric layer 120 also allows the "escape" by diffusion of hydrogen that may form in the surrounding of the optical fibers, so that possible hydrogen generated within the cable does not accumulate in time reaching a concentration suitable to cause attenuation in the optical fibers.

The water-blocking thread material layer 115 also contributes to protect the optical fibers against heat radially propagated in the cable, and further prevents the longitudinal propagation of water. The use of glass fibers in the water-blocking layer 115 has the further advantage that an anti-rodents protection of the cable is achieved.

The copper conductors 130 form the earth conductor of the cable of the invention and contribute, together with the polymeric layer 120, to provide the cable with mechanical strength, thereby ensuring that the optical fibers are suitably protected. The copper conductors 130 also help to protect the cable against attacks by animals like rodents. For example, a cable according to the invention designed for having a resistance 0.387 Ohm/km was provided with sixteen copper conductors with a diameter of 2.270 mm each.

The mechanical protection provided by the association copper conductors/thermally conducting polymeric layer is such to allow a fast and simple laying out procedure of the cable of the invention, as will be discussed hereinafter.

In FIG. 2 an example of use of a cable of FIGS. 1A and 1B is schematically shown. In a wind mill tower 200 a medium voltage (MV) cable 210 for the transport of the electric power produced departs from a generator/transformer system 201, reaches a cell 205 for the on/off switching to the power grid which the cable 210, like, typically, other MV cables coming from other wind mill towers, is connected to. The cell 205 is generally positioned in the vicinity of the basement of the wind mill tower 200. The MV cable 210 is connected to an earth system 225 (the connection is not illustrated).

A cable 215 according to the invention is laid underground in a trench, typically the same trench of the MV cable 210. The cable 215 is taken out of the trench and brought above the ground level for accessing the optical fibers as needed, in correspondence of a fiber connection box 220, positioned for example in the wind mill tower 200, and for connecting the copper conductors to the earth system 225 of the wind mill tower 200 which, in turn, is connected to the soil.

The connection of the cable 215 to the earth system 225 is can be accomplished at points 230 via, for example, a Cadwell welding procedure. The Cadwell welding procedure comprises the steps of exposing the metallic portions to be welded and positioning the exposed portions in a metallic two-valve mold. Said mold, when closed, gives place to a hopper in one of the surface of the mold. The hopper is charged with welding powder and ignition powder, the latter being provided on the edges of the mold too, then the hopper is firmly closed with a cap and a gun is applied in contact with the ignition powder for kindling.

In the illustrated example, the points 230 are two, for assuring the continuity of the earth connection between each wind mill tower earth system and the earth system of the electric grid (not illustrated). The MV cable 210 can be connected to the earth system 225 at at least one point 230 or at different point(s).

The telecommunication connection useful, for example, for the control of the wind mill tower operation can be carried out by cutting off the copper conductors of the cable 215, extracting the optical fibers and splicing them to pigtails in the connection box 220. The cutting off the copper conductors can be carried out at any point of the cable 215 downstream the earth connection at points 230.

Figure 3:
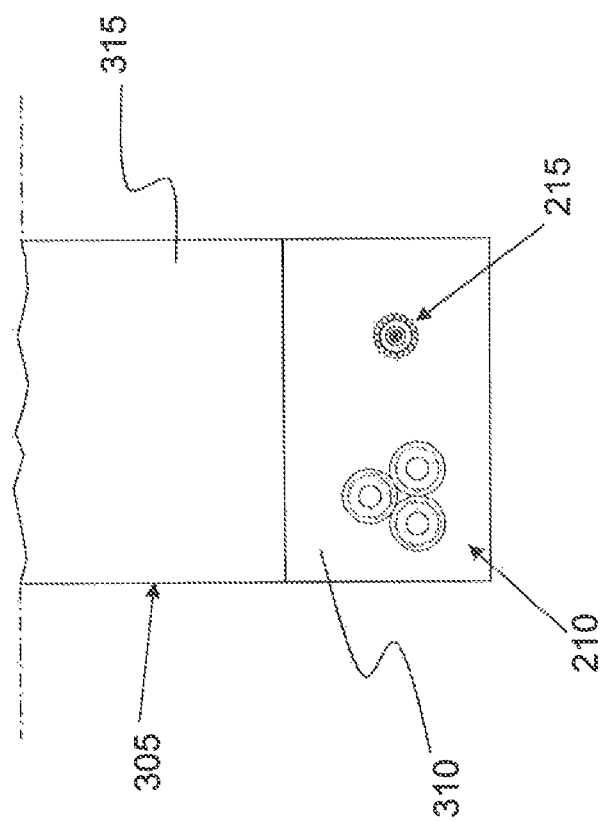
FIG. 3 schematically shows, in cross section, a detail of the underground laying arrangement of the cables of FIG. 2.

FIG. 3 schematically shows an advantageous laying arrangement for the cable 215 according to the invention. A trench 305 is excavated in the soil for laying the cable 215. A layer 310 of ground material of relatively small particle size, selected for example from the trench excavation material, is deposited at the bottom of the trench 305, and the cable 215 is laid, together with the MV distribution cable 210; the same, small-particle-size ground material is then used to cover the cable 215 and the MV distribution cable 210: these two cables thus result buried within the small-particle-size ground material. Then, the trench 305 is filled with other material 315, for example the remainder of the trench excavation material. No sand bedding is necessary.

In the manufacturing of the cable of the invention, the copper wires 130 are paid off respective bobbins and stranded around the polymeric layer 120 with a predetermined stranding pitch, for example of 185 mm with an angle of 11.5°.

The pulling force applied to the copper wires 130 during their stranding around the thermally conducting polymeric layer 120 should be adjusted in order to avoid possible damages to the optical fibers and to ensure a sufficient excess length of optical fibers, so as to guarantee the good behavior of the cable in different climatic conditions.

Preferably, the copper wires 130 form an essentially continuous cover without apertures and without uncovered parts of the underlying thermally conducting polymeric layer 120. A good reciprocal contact between adjacent copper wires 130 should be ensured, both to guarantee good performance of the cable as earth conductor, and to protect the underlying layers from the heat generated and the materials used during the welding procedure for effecting the electrical connection to the earth system.

The invention claimed is:

1. An earth cable capable of being adapted for laying underground, comprising:
    at least one optical fiber;
        a thermally conducting polymeric layer surrounding the at least one optical fiber, the thermally conducting polymeric layer having a thermal conductivity of at least 0.3 W/m·K; and
        conductors arranged in a radially-external position with respect to the thermally conducting polymeric layer, wherein the conductors consist of copper and form an outermost layer of the earth cable, and
        wherein the copper conductors are in direct contact with the thermally conducting polymeric layer.

2. The earth cable of claim 1, wherein the thermally conducting polymeric layer has a thermal conductivity of at least 0.4 W/m·K.

3. The earth cable of claim 1, wherein the thermally conducting polymeric layer has a thermal conductivity of up to 0.9 W/m·K.

4. The earth cable of claim 1, wherein the thermal conducting polymeric layer comprises a flame-retardant material.

5. The earth cable of claim 1, wherein the thermally conducting polymeric layer comprises a fire-retardant material.

6. The earth cable of claim 1, wherein the thermally conducting polymeric layer is based on a material selected from: ethylene or propylene polymers or copolymers, and a mixture thereof.

7. The earth cable of claim 6, wherein the thermally conducting polymeric layer comprises a flame-retardant filler.

8. The earth cable of claim 1, further comprising a water-blocking thread layer surrounding the at least one optical fiber and arranged internally to the thermally conducting polymeric layer.

9. The earth cable of claim 8, wherein the water-blocking thread layer comprises at least one of aramid yarns and glass fibers.

10. An electric grounding system, comprising:
    a general ground;
    at least one earth cable comprising an electrical conductor connected to the general ground;
    at least one optical fiber;
    a thermally conducting polymeric layer surrounding the at least one optical fiber, the thermally conducting polymeric layer having a thermal conductivity of at least 0.3 W/m*K; and
    conductors arranged in a radially-external position with respect to the thermally conducting polymeric layer, the copper conductors forming said electrical conductor,
    wherein the conductors consist of copper and form an outermost layer of the earth cable, and
    wherein the copper conductors are in direct contact with the thermally conducting polymeric layer.

11. The electrical grounding system of claim 10, wherein the at least one earth cable is laid underground.

12. The electrical grounding system of claim 10, wherein the electrical conductor of the earth cable is connected to the general ground through welding.

* * * * *